United States Patent
Knapp

(10) Patent No.: US 6,290,240 B1
(45) Date of Patent: Sep. 18, 2001

(54) GROMMET CUP PACKING MADE OF ELASTOMERIC MATERIAL FOR HYDRAULIC APPARATUS

(75) Inventor: Francesco Knapp, Cava Manara (IT)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 09/077,182

(22) PCT Filed: Sep. 11, 1997

(86) PCT No.: PCT/US97/16075

§ 371 Date: Aug. 2, 1999

§ 102(e) Date: Aug. 2, 1999

(87) PCT Pub. No.: WO98/15467

PCT Pub. Date: Apr. 16, 1998

(30) Foreign Application Priority Data

Oct. 8, 1996 (IT) .............................. TO96A0816

(51) Int. Cl.⁷ ............................... F16J 15/10; F16J 15/12
(52) U.S. Cl. .......................... 277/651; 277/650; 277/616; 277/637
(58) Field of Search ..................... 277/651, 640, 277/650, 637, 616, 944; 137/454.5, 454.6, 625.17, 625.31, 625.32; 264/273

(56) References Cited

U.S. PATENT DOCUMENTS

| | | | |
|---|---|---|---|
| 2,062,186 | * 11/1936 | Mittelman | 277/608 |
| 2,069,212 | * 2/1937 | Buffington | 277/439 |
| 2,345,515 | * 3/1944 | Tweedale | 277/638 |
| 4,298,203 | * 11/1981 | Hölzer et al. | 277/560 |
| 4,538,819 | * 9/1985 | Wagner et al. | 277/606 |
| 4,674,756 | * 6/1987 | Fallon et al. | 277/624 |
| 5,004,650 | * 4/1991 | Ashizawa et al. | 277/944 |
| 5,011,162 | * 4/1991 | Jelinek | 277/644 |
| 5,518,027 | * 5/1996 | Saiki et al. | 137/625.17 X |
| 6,116,279 | * 9/2000 | Pawelzik et al. | 137/625.17 X |

* cited by examiner

Primary Examiner—Anthony Knight
(74) Attorney, Agent, or Firm—Kwadjo Adusei-Poku; Lloyd D. Doigan

(57) ABSTRACT

A packing assembly for a hydraulic apparatus, for example a faucet comprising first and second members in fluid communication with each other, the second member having a recessed seat adapted to receive a substantially cylindrical core member, the core member having outwardly extending flanges from the top and bottom ends thereof, an elastomeric packing insert set into the recessed seat and secured about the core member, such that the core member provides reinforcement to the packing insert, and a spring received within the recessed seat of the second member, such that the spring maintains the core member and the packing insert in sealing contact with the first member.

7 Claims, 2 Drawing Sheets

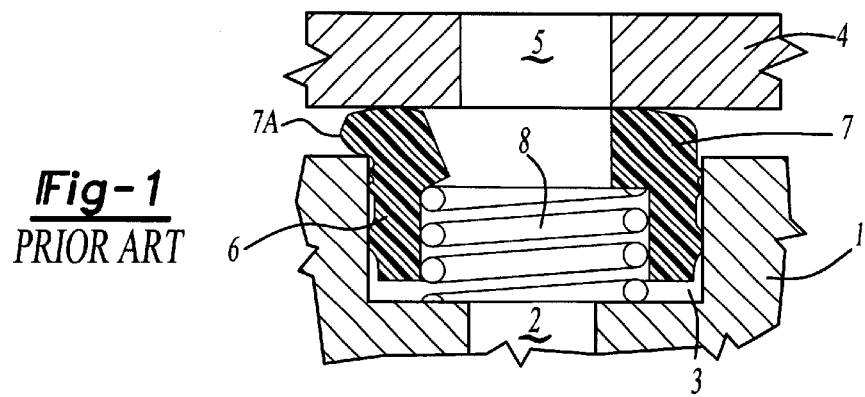
Fig-1
*PRIOR ART*
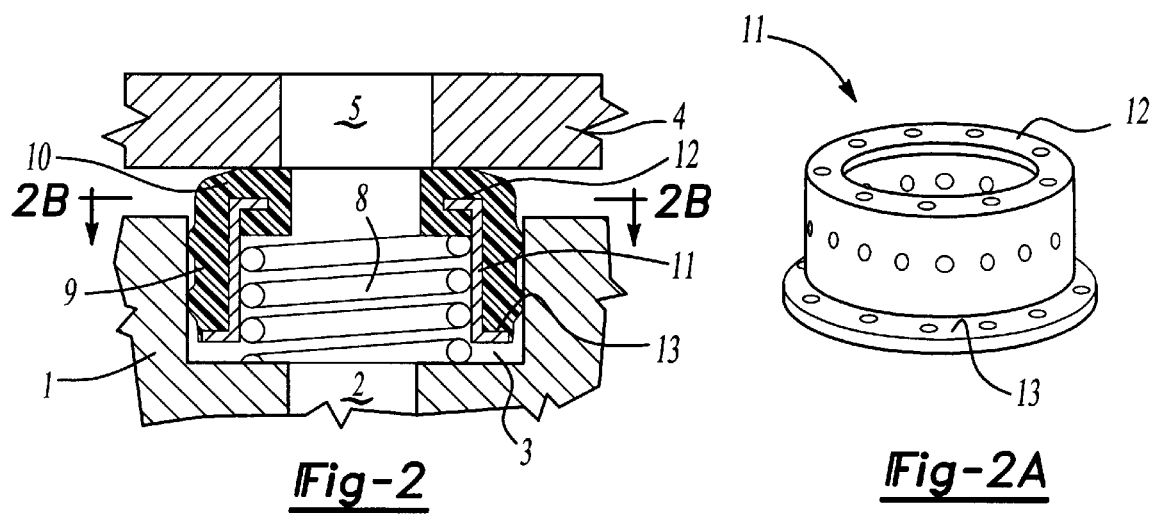
Fig-2
Fig-2A
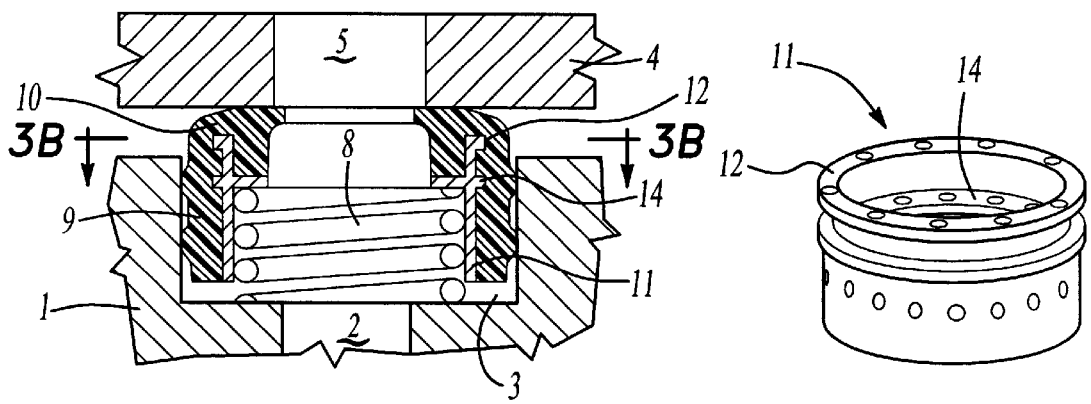
Fig-3
Fig-3A

GROMMET CUP PACKING MADE OF ELASTOMERIC MATERIAL FOR HYDRAULIC APPARATUS

FIELD OF THE INVENTION

This invention relates to a grommet cup packing made of elastomeric material for hydraulic apparatus.

BACKGROUND OF THE INVENTION

These packings are used to form a seal between two cooperating parts of a hydraulic apparatus, primarily faucets and cartridges for faucets. The cup packing is inserted in a seat that is recessed in one of the two parts between which a seal must be established, and it is forced into contact with the other part. The force is often applied by a spring housed inside the cup packing, but it can also be applied by means of diverse or diversely arranged members or by the elasticity of the elastomeric material comprising the cup packing. To establish the best possible hydraulic seal these packings should be made of an elastomeric material that has a high degree of elastic yield. As a rule, conventional cup packings have a circular cross-section.

The conventional and known cup packings have serious disadvantages. For both technical and regulatory reasons hydraulic apparatus must be able to resist high pressures which, according to some standards, attain 50 bar and even 120 bar. If the cup packings are comprised of elastomeric material under high pressures, and especially in the case of pressure surges, they can become deformed and can even burst. This means that such packings must be made with relatively rigid elastomeric material which is unable to establish the best possible seal. This phenomenon is also present when the packings are installed under operationally static conditions.

When such packings are used under operationally dynamic conditions, i.e., when they must establish a seal between reciprocally movable parts, there is yet another disadvantage. When one of the two parts, between which the cup packing establishes a seal, is shifted with respect to the other part in which the cup packing is seated, then the packing tends to be dragged, due to friction, and is deformed. If the movable part is a shutter that has passage openings which must be open or closed during displacement, then the deformation of the packing modifies the relative positions in which the passage openings are controlled, and if said deformation is excessive it impairs the precision of the shutter's operation and may even actually jeopardize the proper closing, for example, of a faucet.

It has been proposed to rigidify a cup packing by inserting a bushing made of rigid material such as a plastic. However, this procedure has not proven to be sufficiently effective due to the fact that the pressure can be transmitted to the interface between the cup packing and the inserted bushing, and it can thus act on the packing itself causing the above discussed disadvantages.

One purpose of this invention is to provide a cup packing consisting of a relatively yielding elastomeric material which would be able to establish a good seal and which will be able to resist high pressures and pressure surges.

Another purpose of this invention is to provide a cup packing which would be particularly suitable for dynamic operation due to the fact that it does not undergo excessive deformation due to by the displacement of the parts between which the seal is established.

Yet another object of the invention is to provide a cup packing which can be formed with a noncircular cross-section.

SUMMARY OF THE INVENTION

These objects are attained according to this invention by virtue of the fact that the packing has a composite structure. This composite structure is comprised of an elastomeric material (which can have considerable yielding capacity) in the portions intended to establish a seal and of a rigid or semirigid material (such as a suitable plastic material or a metallic material) corresponding to a core that is at least partly incorporated in the elastomeric material of the packing.

In this composite structure the elastomeric material only functions to establish the hydraulic seal. It is thus practically relieved of all of the mechanical resistance functions of the packing which are entirely or almost entirely performed by the incorporated core, which takes the stresses to which the packing is subjected, both under static conditions and under dynamic conditions. This means that one can separately design with different criteria, especially with regard to the choice of materials, the two parts of the packing's structure. The packing of the instant invention has a high degree of sealing due to the choice of a sufficiently yielding elastomer and a high degree of resistance to deformations due to the choice of appropriate shapes and composition of the core.

Preferably, the core which is incorporated in the elastomeric material is provided with anchoring means that can secure the elastomeric material to the core itself.

In particular, the core can consist of a portion that extends axially, having a cross-section that substantially corresponds to the cross-section of the packing, from which laterally extend sections of flange that at least partly extend radially in the elastomeric material.

The packing of this invention is preferably made by injecting an elastomeric material in the fluid state into a mold so as to incorporate a rigid or semirigid core, and then cross-linking the elastomeric material that constitutes the packing.

In contrast to known and conventional cup packings, the packing of this invention need not have a circular cross-section. The packing can considerably diverge from this usual circular shape, providing that the seat in which it is seated has a corresponding shape. It is also possible to provide different shapes to the portion of the packing that is seated in a seat of one of the two parts between which the seal is established and to the portion of the packing that provides the seal.

These and other features, purposes and advantages of this invention will be apparent from the following description of some of the embodiments illustrated in the attached drawings.

BRIEF DESCRIPTION OF THE DRAWINGS

FIG. 1 schematically illustrates in axial cross-section how a prior art and conventional packing is deformed by high internal pressure;

DETAILED DESCRIPTION OF THE PREFERRED EMBODIMENT

Figure 2B:
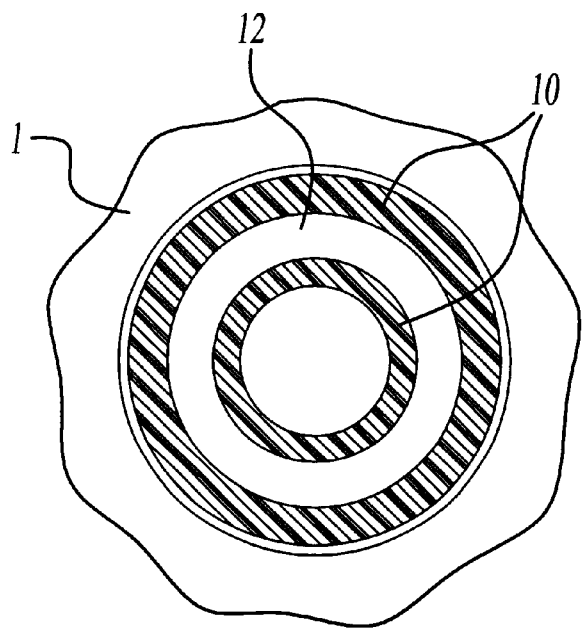
FIG. 2 illustrates one embodiment, in axial cross-section, of a packing of the instant invention.

Conventional and prior art packing, illustrated in FIG. 1, is intended to establish a seal between a first part 1 (for example, the bottom of a faucet or a cartridge for a faucet) and a second part 4 (for example, a fixed flow control plate) having respective passages 2 and 5 therein. The first part has a recessed seat 3 in which the packing is inserted. The conventional and prior art packing comprises a body 6 made of elastomeric material provided with external peripheral projections to provide a seal in seat 3 of first part 1. The body 6 at its upper extremity forms a head 7 which makes a seal with the lower surface of second part 4. A spring 8 is disposed in body 6 of the packing and works between the bottom of seat 3 and head 7 of the packing so as to push the head 7 into contact with the second part 4 at a pressure effective to establish a seal.

When a high pressure is transmitted to the inside of body 6 through passages 2 and 5, head 7 of said packing tends to be pushed toward the outside in the space that separates the two parts 1 and 4 and head 7, becomes deformed, as shown at 7A in the left side of FIG. 1. This deformation can be permanent and can compromise the operation of the packing. This leads to the previously mentioned disadvantages, which the instant invention seeks to prevent.

Figure 3B:
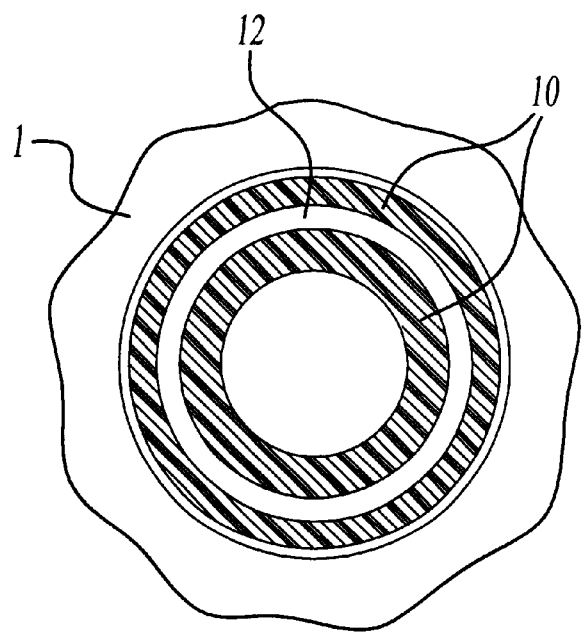
FIG. 3 illustrates a second embodiment, in axial crosssection, of the packing of the instant invention.

FIGS. 2 and 3 show two embodiments of the cup packing of the instant invention. In these two figures parts corresponding to those in FIG. 1 are labeled with the same reference numerals and will not be described any further.

The packing of the embodiment illustrated in FIG. 2 comprises a body 9 made of elastomeric material with peripheral projections for the seal in seat 3 of first part 1 and a head 10 adapted to provide a seal against the lower surface of second part 4. In body 9 and head 10 there is at least partly incorporated a core made of rigid material consisting of a portion 11 that extends axially along body 9 with a cross-section that substantially corresponds to that of the cup packing, and upper flange sections 12 that extend inside head 10. The presence of this core prevents the deformation of said body, specifically of head 10, in the presence of high pressures that are transmitted through passages 2 and 5 to the inside of body 9. A proper selection of the shape of core 11, 12 and of material comprising it will enable the packing's pressure resistance to attain any value that may be required for technical or regulatory reasons.

Preferably, as shown in FIG. 2, portion 11 of the core extends downwardly to form sections of flange 13 that support the bottom of body 9 made of elastomeric material, thus contributing to its stability.

In the embodiment illustrated in FIG. 3, portion 11 of the core has its upper flange sections 12 incorporated into the head 10 of the packing which, as shown, are turned toward the outside rather than toward the inside as in the embodiment in FIG. 2. The flanges can also be provided on both sides of portion 11, that is to say, facing or extending toward the inside and toward the outside. This arrangement is shown in FIG. 3 by flange section 14 which are arranged so as to correspond to the lower surface of head 10 and which serve the functions of providing a rigid support surface for spring 8. It is to be understood that flanges 13, as illustrated in FIG. 2, and flanges 14, as illustrated in FIG. 3, could be found in the same structure.

Flange sections 12, 13 and 14 can extend in a continuous manner all around portion 11 or the core to give the latter greater resistance to radial stresses. In [As] an alternative embodiment, as best shown in FIGS. 2A and 3A, each section of the core member, including the body section 11 and the flange sections 12, 13 and 14, [the flange sections can also be interrupted or perforated] may include interruptions or perforations, to ensure more perfect anchorage of the core with respect to the elastomeric material. [For the same purpose, portion 11 can also have perforations.]

The cup packing is preferably prepared by injecting an elastomeric material in the fluid state to form body 9 and head 10 into a mold containing a core 11 and flanges 12, 13, 14 comprised of rigid or material and cross-linking the elastomeric material that comprises the packing. This procedure constitutes a convenient and easy process of making the composite packings. The procedure is facilitated if (as in the embodiments shown) the incorporated core partly uncovered toward the outside. This makes it possible to provide in the mold effective supports for the core to be incorporated in the elastomeric material.

In the embodiments illustrated in FIGS. 2 and 3 the packing is moved into engagement with part 4 by a spring 8 housed in body 9. However, spring 8 can be arranged in a different way, or it can be replaced by any other elastic means. In particular, the lower portion of body 9 can be extended beyond the end of core 11 so as to rest against the bottom of seat 3 and to provide the elastic push required by the packing.

In view of the great resistance that can be imparted to the cup packing of the instant invention, the packing is not limited to a circular cross-section and can be different from the shape being inserted in a corresponding seat 3. In particular, head 10 of the packing can have a shape that is different from that of body 9.

While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A grommet cup packing for a hydraulic apparatus having a first part and a second part, the second part having a recessed seat, wherein the packing forms a hydraulic seal between the first part and the second part, the packing comprising:

an elastomeric insert having a body portion and a head portion, the body portion being inserted within the recessed seat of the second part, and the head portion being in sealing contact with the first part of the hydraulic apparatus; and a core member having a substantially cylindrical body section, the body section having a top end and a bottom end, a top section extending inwardly from the top end of the body section to form an inner annular ledge, and a tail section extending outwardly from the bottom end of the body section thereby forming an annular flange, the core member being embedded within the elastomeric insert, such that the top section and the tail section of the core member provide reinforcement to the elastomeric insert, and wherein the top and tail sections of the core member are perforated.

2. The packing according to claim 1, wherein the body section of the core member is perforated.

3. The packing according to claim 1, wherein the elastomeric insert is formed by injecting an elastomeric material in the fluid state into a mold containing the core member, incorporating the core member and successively proceeding to cross-link the elastomeric material.

4. The packing according to claim 1, wherein the elastomeric insert and the core member both have noncircular cross-sections.

5. The packing according to claim 1, wherein the body portion of the elastomeric insert has a cross-section different from the cross-section of the head portion of the elastomeric insert.

6. The packing according to claim 1, wherein the core member is made from a plastic material.

7. The packing according to claim 1, wherein the core member is made from a metallic material.

* * * * *

UNITED STATES PATENT AND TRADEMARK OFFICE
CERTIFICATE OF CORRECTION

PATENT NO. : 6,290,240 B1
DATED : September 18, 2001
INVENTOR(S) : Francesco Knapp Page 1 of 1

It is certified that error appears in the above-identified patent and that said Letters Patent is hereby corrected as shown below:

Column 1,
Line 59, after "due to" insert -- friction --

Column 3,
Line 52, delete "[As]"
Lines 55-56, delete "[the flange sections can also be interrupted or perforated]"
Lines 58-59, delete "[For the same purpose, portion 11 can also have perforations.]"
Line 63, after "rigid or" insert -- semi-rigid --
Line 66, after "core" insert -- remains --

Signed and Sealed this

Thirtieth Day of April, 2002

Attest:

JAMES E. ROGAN
*Director of the United States Patent and Trademark Office*

*Attesting Officer*